United States Patent
Shantharam et al.

(10) Patent No.: US 11,146,644 B2
(45) Date of Patent: Oct. 12, 2021

(54) APPARATUS AND METHOD FOR SELECTING DEVICES WITHIN AN INTERNET OF THINGS FOR CONNECTING AND DISCONNECTING

(71) Applicant: KAHA PTE. LTD., Singapore (SG)

(72) Inventors: Sudheendra Shantharam, Bangalore (IN); Prashant Adkoli, Bangalore (IN)

(73) Assignee: KAHA PTE. LTD., Singapore (SG)

( * ) Notice: Subject to any disclaimer, the term of this patent is extended or adjusted under 35 U.S.C. 154(b) by 0 days.

(21) Appl. No.: 16/625,831

(22) PCT Filed: Jun. 25, 2018

(86) PCT No.: PCT/SG2018/050307
§ 371 (c)(1),
(2) Date: Dec. 23, 2019

(87) PCT Pub. No.: WO2018/236290
PCT Pub. Date: Dec. 27, 2018

(65) Prior Publication Data
US 2020/0128084 A1    Apr. 23, 2020

(30) Foreign Application Priority Data

Jun. 24, 2017 (IN) .............. 201711022234

(51) Int. Cl.
*G06F 15/16* (2006.01)
*H04L 29/08* (2006.01)
(Continued)

(52) U.S. Cl.
CPC ............ *H04L 67/141* (2013.01); *G06F 1/163* (2013.01); *G06F 1/1698* (2013.01); *G06F 3/017* (2013.01);
(Continued)

(58) Field of Classification Search
CPC ....... H04L 67/141; H04L 67/16; H04L 67/12; H04W 76/15; H04W 76/30; H04W 4/80;
(Continued)

(56) References Cited

U.S. PATENT DOCUMENTS

2014/0045430 A1* 2/2014 Kim .................. H04B 7/26
455/41.2
2014/0266731 A1* 9/2014 Malhotra ................ G06F 1/163
340/573.1
(Continued)

FOREIGN PATENT DOCUMENTS

CN          104539735 A      4/2015
WO       2015173653 A2      11/2015

OTHER PUBLICATIONS

International Search Report and Written Opinion for PCT/SG2018/050307 dated Aug. 23, 2018.
(Continued)

*Primary Examiner* — John B Walsh
(74) *Attorney, Agent, or Firm* — Thomas | Horstemeyer, LLP (57) ABSTRACT

An apparatus and method for selecting devices within an Internet of Things (IoT) for connecting and disconnecting is disclosed. The method comprises selection of the one or more second devices by a user and providing selection input, for example by pushing the push button on the side of the watch. The user input is captured and a characteristic of the one or more second device is modified, which is transmitted as a signal of readiness for connecting to the first device. The signal is captured by the first device and the one or more selected second devices connect to the first device. Disconnection of the one or more second devices connected to the first device may be effected in a similar way by providing input, which modifies a characteristic of the second device.

(Continued)

The modified characteristic is detectable by the first device to effect automatic disconnection.

13 Claims, 6 Drawing Sheets

(51) Int. Cl.
  *H04W 76/15*   (2018.01)
  *H04W 76/30*   (2018.01)
  *H04W 4/80*    (2018.01)
  *G06F 1/16*    (2006.01)
  *G06F 3/01*    (2006.01)
  *G06F 3/0354*  (2013.01)

(52) U.S. Cl.
  CPC .......... *G06F 3/03547* (2013.01); *H04W 4/80* (2018.02); *H04W 76/15* (2018.02); *H04W 76/30* (2018.02)

(58) Field of Classification Search
  CPC ...... H04W 76/10; G06F 1/163; G06F 1/1698; G06F 3/017; G06F 3/03547; G06F 3/014
  See application file for complete search history.

(56) References Cited

U.S. PATENT DOCUMENTS

| | | | |
|---|---|---|---|
| 2016/0034877 A1 | 2/2016 | Lee | |
| 2016/0275472 A1* | 9/2016 | Rajamannar | H04B 1/385 |
| 2017/0004475 A1* | 1/2017 | White | G07G 1/009 |
| 2017/0064071 A1 | 3/2017 | Won et al. | |
| 2017/0068437 A1 | 3/2017 | Warren et al. | |
| 2018/0220482 A1* | 8/2018 | Kuang | H04W 76/15 |

OTHER PUBLICATIONS

"Connect via Bluetooth", Nexus Help, Wireless & Connectivity Settings, Apr. 30, 2016 [Retrieved on Dec. 20, 2019 from https://web.archive.org/web/20160430102147/https://support.google.com/nexus/answer/2819579?hl=en].

Pair Two Android Phones via Bluetoothm: Softwarert.com, Feb. 9, 2017 [Retrieved on Dec. 20, 2019 from https://web.archive.org/web/20160430102147/https://support.google.com/nexus/answer/2819579?hl=en].

* cited by examiner

APPARATUS AND METHOD FOR SELECTING DEVICES WITHIN AN INTERNET OF THINGS FOR CONNECTING AND DISCONNECTING

CROSS-REFERENCE TO RELATED APPLICATIONS

This application is a § 371 national phase application of PCT/SG2018/050307 filed Jun. 25, 2018 entitled "APPARATUS AND METHOD FOR SELECTING DEVICES WITHIN AN INTERNET OF THINGS FOR CONNECTING AND DISCONNECTING," which claims the benefit of and priority to Indian Patent Application No. 201711022234 filed Jun. 24, 2017, the contents of which being incorporated by reference in their entireties herein.

FIELD OF THE INVENTION

The present invention generally relates to controlling of smart devices and particularly relates to methods and apparatuses for establishing connection and disconnection between mobile devices and smart wearable devices.

BACKGROUND OF THE INVENTION

Nowadays, users generally possess numerous smart devices, some of which are wearable. These smart devices are typically connected to a portable device, such as a smart phone, having a graphical user interface (GUI). The smart devices and the portable device form an Internet of Things (IoT).

In many instances, only a subset of these smart devices possessed by the user are used. In such instances only, the subset of smart devices which are in use are required to be connected to the portable device. For example, a user may wear a smart watch and a smart ring on one occasion such as while at a social gathering and a smart fitness wristband on another occasion such as while at a gym session. Smart devices possessed by the user but not in use at a particular instant need not be connected to the portable device with the GUI.

Generally, the smart device is approved to connect to the portable device and paired at the time of purchase or at first instance of use. Henceforth, each time the smart device is in range of the portable device, the smart device automatically connects with the portable device. A problem arises when the user wants to connect to a smart device and the user does not know which smart device to connect (if two watches are kept side by side) as the names and types of the connected devices appearing in the list may be similar (for example, watch_8823 and watch_0282).

Further, if the user desires to disconnect a particular smart device, the user is required to access and effect the disconnection through an application corresponding to the particular smart device, loaded on the portable device. For instance, the user may manually remove the un-used devices from the list (with the device names, type) of all connected devices (within a range). However, when the names and type of the connected devices are similar, it becomes difficult for the user to know which device to be disconnected at this moment.

Further, individual applications corresponding to each smart device that is to be disconnected is required to be accessed. Accessing individual applications for each smart device is cumbersome for the user. Further, some applications do not provide a disconnection option. In such cases, the user has to disable the radio for example, Bluetooth, WIFI etc., of the smart device and/or the portable device to disconnect the smart device from the portable device.

Disabling the radio, disconnects all smart devices, some of which may be needed by the user. Due to the challenges described above automatic connection of all paired smart devices as soon as they are in range of the portable with the portable device is undesirable.

Therefore, there is a need in the art for an apparatus and method for selecting a subset of devices, without user intervention on the device with GUI, within an IoT for connecting and disconnecting.

SUMMARY OF THE INVENTION

The present invention is directed towards controlling, and in particularly, connecting and disconnecting of a smart IoT device that substantially obviates one or more problems due to limitations and disadvantages of the related art.

In an embodiment of the present invention, a method for establishing a connection and a disconnection between a mobile device and a smart wearable device is provided. The method includes the steps of detecting a plurality of smart wearable devices found to be in a communicative range of the mobile device over a communication network; displaying a list comprising a first type of information corresponding to each of the detected plurality of smart wearable devices; receiving a request to establish a connection from at least one smart wearable device amongst the detected plurality of smart wearable devices, wherein the request to establish the connection is generated in response to an activity of a user in respect of the at least one smart wearable device; selecting a predefined rule to modify the first type of information into a second type of information regarding the at least one smart wearable device generating the request to establish the connection; displaying the second type of information regarding the at least one smart wearable device in accordance with the predefined rule; and establishing a communication between the at least one smart wearable device having the second type of information and the mobile device. In an optional embodiment, the mobile device may receive an input from the user to connect with the at least one smart wearable device linked with the second type of information.

In an embodiment of the present invention, an apparatus for establishing a connection and disconnection with a smart wearable device is provided. The apparatus includes a wireless communication module configured to detect a plurality of smart wearable devices found to be in a communicative range over a communication network; a display unit configured to display a list comprising a first type of information corresponding to each of the detected plurality of smart wearable devices; a receiver configured to receive a request to establish a connection from at least one smart wearable device amongst the detected plurality of smart wearable devices, wherein the request to establish the connection is generated in response to an activity of a user in respect of the at least one smart wearable device; a controlling unit configured to select a predefined rule to modify the first type of information into a second type of information regarding the at least one smart wearable device generating the request to establish the connection; the display unit configured to display the second type of information regarding the at least one smart wearable device in accordance with the predefined rule; wherein the controlling unit is configured to establish a communication between the at least one smart wearable device and the apparatus. In a yet another embodiment, a transceiver is configured to receive an input from the user to connect with the at least one smart wearable device linked with the second type of information. In yet another embodiment, the apparatus is an electronic device, for example, a mobile device.

An object of the present invention is to provide method and apparatus for selecting a subset of devices, without user intervention on the device with GUI, within an IoT for connecting and disconnecting.

An object of the present invention is to provide method and apparatus to decrease power consumption by user devices by not connecting the portable user device to unused devices.

Another object of the present invention is to reduce amount of the radio waves in the vicinity of the user by reducing the connections of the user portable device with unused smart devices.

Another object of the present invention is that the connection can happen automatically, thus avoiding manual intervention between the smart wearable device and mobile device, which considerably decreases the cumbersome method of choosing appropriate devices.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts/flow diagrams illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to 'an aspect_, 'another aspect_ or similar language means that a particular feature, structure, or characteristic described in connection with the embodiment is included in at least one embodiment of the present invention. Thus, appearances of the phrase 'in an embodiment_, 'in another embodiment_ and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises ... a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

Figure 1:
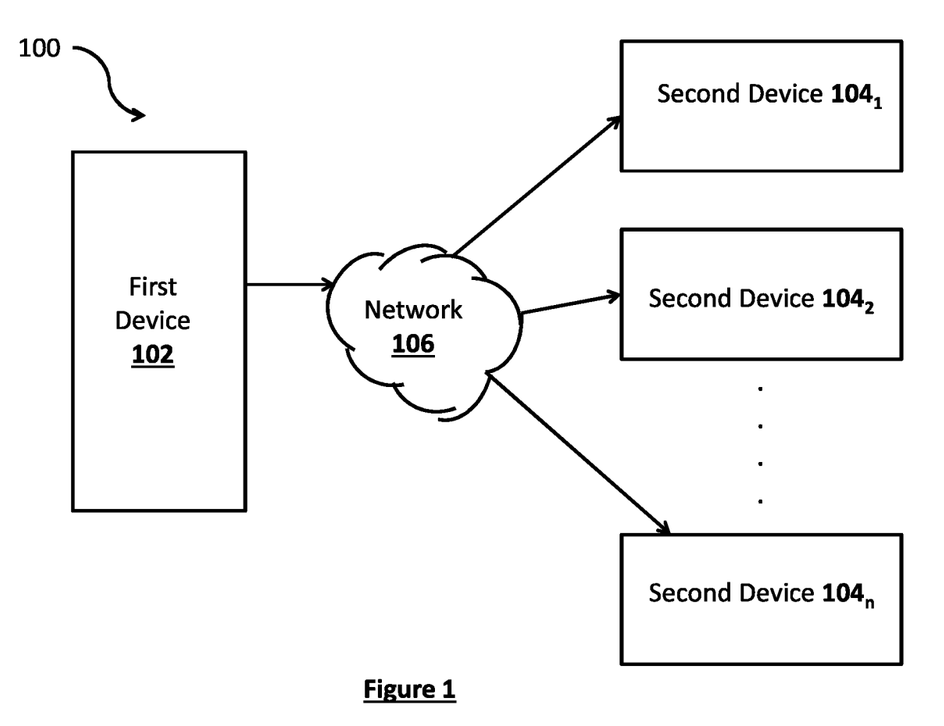
FIG. 1 depicts an Internet of Things (IoT) comprising a first device and one or more second devices.

FIG. 1 depicts the Internet of Things (IoT) 100 comprising a first device 102 connectable to one or more second devices $104_{1\ddot{u}\ n}$ through a network 106 or Internet or short range wireless communication methods like WIFI or Bluetooth or any other means of wired or wireless connection. The first device 102 is preferably a portable device, such as a mobile device, having a graphical user interface (GUI) and is carried in person by a user, and each of the one or more second devices $104_{1\ddot{u}\ n}$ is preferably smart device, and more preferably a smart wearable device. The network 106 may for example be a radio network providing a short range, preferably between about 10 m-100 m, and more preferably between about 10 m-30 m of the first device 102 and the one or more second devices $104_{1\ddot{u}\ n}$ connect with each other.

Most of these smart devices need to connect to a portable device having the graphical user interface (GUI) such as a smart phone, to make use of complete set of features of the smart device. Some of the common form factors include watches and wrist bands. Examples of smart devices may include, but not limited to, a smart watch, smart fitness bands, smart shoes, smart glass, smart earphones/headphones, smart clothing, smart jewelry to name a few.

Figure 2:
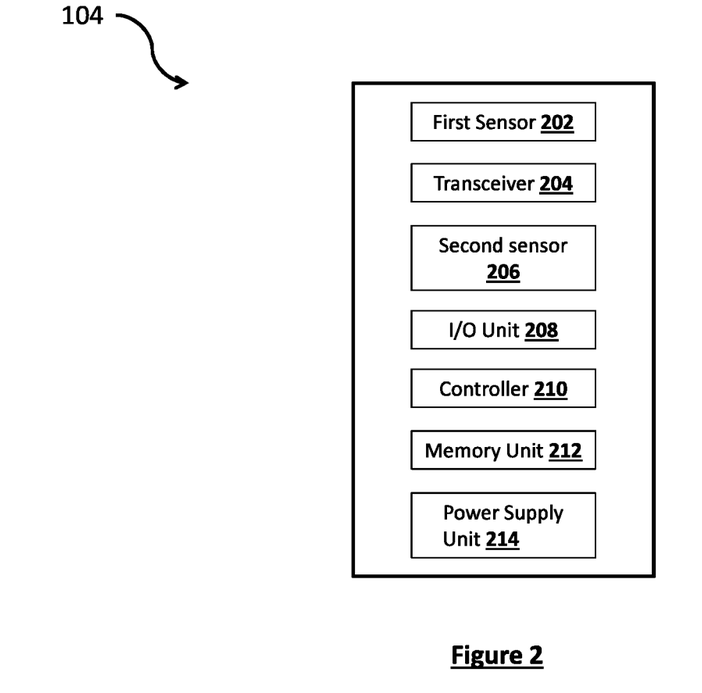
FIG. 2 depicts an environment where one of the one or more second devices or smart wearable devices is connectable to the first device within the IoT.

FIG. 2 depicts an environment where one of the one or more second devices or smart wearable devices is connectable to the first device within the IoT. Each of the one or more second devices $104_{1 \ddot{u} n}$ (collectively referred to as 104) or smart devices includes a first sensor 202 such as, accelerometers, location sensors for example GPS, step-counters, blood pressure sensors, heart rate sensors among others which capture various types of data associated with the user. This data is communicated through a transceiver 204 to the first device 102 for further processing when the first device 102 and the one or more second devices 104 are connected by means of authorization to exchange data. Further the one or more second devices 104 comprise a second sensor 206 for sensing user selection input, received via an I/O unit 208, which is captured by a controller 210 and transmitted by the transceiver 202. The second sensor 206 may, for example be a touch sensing device, a push button on a top surface or side of the wearable smart device, a biometric device, a gesture sensing device, a movement sensing device, a light sensing device or a sound sensing device among others. The user selection effects a change in voltage or current, which is captured by the controller 210 working in operational interconnection with the second sensor 206. Each of the one or more second devices 104 also include a memory unit 212 for storing data captured by various sensors. The commands for the operation of the each of the second devices 104 are pre-programmed in memory unit 212. The one or more second devices 104 further includes a power supply unit 214 including a battery for supplying power to various modules/units of the one or more second devices 104.

Figure 3:
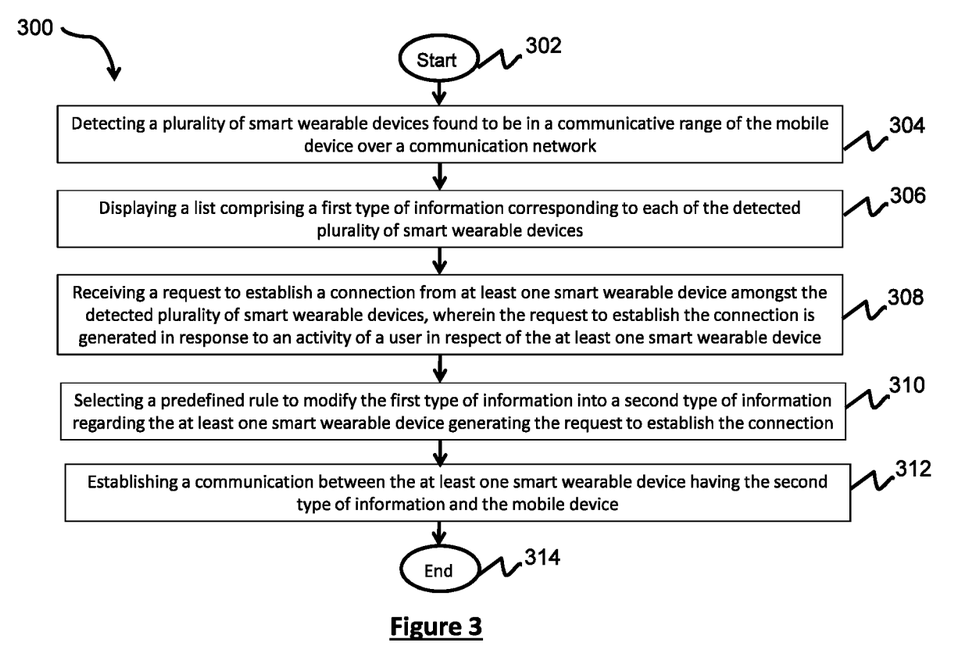
FIG. 3 depicts a flow diagram depicting a method for establishing a connection and a disconnection between a mobile device and a smart wearable device in accordance with an embodiment of the present invention.

Referring to FIG. 3, a flow diagram for a method for establishing a connection and a disconnection between a mobile device and a smart wearable device in accordance with an embodiment of the present invention is illustrated. The method 300 starts at 302. At step 304, a plurality of smart wearable devices (one or more second devices 104) found to be in a communicative range of the mobile device (first device 102) over a communication network (106) are detected. In an embodiment, at step 306, a list comprising a first type of information corresponding to each of the detected plurality of smart wearable devices is displayed onto the first device (user mobile device). By default, a list of smart wearable devices is displayed in the mobile device. Generally, the Bluetooth module of the mobile device lists all the connected and paired devices, separately. In an embodiment, a mobile application is configured in the mobile device, which is capable of detecting and listing the paired devices (whenever, the devices come in the range) and connecting them.

The first type of information preferably includes at least a name and a type of the each of the detected plurality of smart wearable devices. The name of the smart wearable device is generally the name of the device kept by the user of the smart device or may be the default name set by the smart wearable device manufacture. The name may also include the model number of the smart wearable device. The type refers to the form of the device. For instance, the type may include a watch, jewelry, fitness band, earphones/headphones and so on. By way of example, the first type of information pertaining to a smart watch may be displayed as 'Watch_8283_, wherein the term 'Watch_ may refer to the type and the term '8283_ may refer to the name or the model number of the watch.

At step 308, the method 300 includes receiving a request to establish a connection from at least one smart wearable device amongst the detected plurality of smart wearable devices. The request to establish the connection in step 308 is generated in response to an activity of a user in respect of the at least one smart wearable device. The activity of the user in respect of the at least one smart wearable device includes at least one of: a touch sensitive input, and a gesture-based input of the user. The touch sensitive input may include any user touch on any part of the smart wearable device. For instance, access of an application menu of the smart device or press or rotation of a button(s). The gesture-based input may include shaking, tapping, rubbing, holding of the smart wearable device.

At step 310, a selection of a predefined rule is received to modify the first type of information into a second type of information regarding the at least one smart wearable device generating the request to establish the connection. The second type of information comprises at least the first type of information regarding the at least one smart wearable device and a respective connectivity status. The connectivity status may include, additional tags that indicate whether the device is ready to connect or not. The connectivity status may also indicate the status of the signal strength in case a connection is made. The predefined rule is configurable by the user. Different rules may be stored for modifying the first type of information into second type of information. The user may also set one of the pre-defined rules as a default rule or may select a specific pre-defined rule at the time of making the selection. The predefined rule may comprise instructions to append a readiness status of the at least one smart wearable device after at least a name and a type of the at least one smart wearable device within the list of detected plurality of smart wearable devices. For instance, the first type of information pertaining to a smart watch displayed as 'Watch_8283_ may be modified to 'Watch_8283_ ready_, wherein the term ready may indicate that the smart device is ready for being connected. The predefined rule may also include instructions to remove, modify or alter any part/content/metadata of the first type of information. The pre-defined rule may also comprise instructions to momentarily highlight the second type of information regarding the at least one smart wearable device. For instance, the second type of information may be highlighted for a predetermined for a period of time to indicate that the smart wearable device against which the activity was performed by the user. The predefined rule may also comprise instructions to hide the list comprising the first type of information corresponding to each of the detected plurality of smart wearable devices; and display only the second type of information regarding the at least one smart wearable device generating the request to establish the connection/the smart wearable device against which the activity was performed by the user.

Once the first type of information is modified into second type of information based on the selected pre-defined rule, a communication is established between the at least one smart wearable device linked with the second type of information and the mobile device in step 312 and the method ends at step 314. The second type of information may be in the form of an altered tag. In an embodiment, second type of information regarding the at least one smart wearable device in accordance with the predefined rule is displayed onto the mobile device. In another embodiment, an input from the user to connect with the at least one smart wearable device linked with the second type of information. A signal of readiness is transmitted for establishing a connection between the one of smart wearable device and the mobile device.

In an embodiment, the communication network comprises at least one of: a Bluetooth, a ZigBee, an Infrared transmission network, a WiFi, USB, a serial connection or any means of wired or wireless connection. The communication network comprises a master and peripheral type of connection between the mobile device and each of the plurality of smart wearable device.

In an embodiment, the method 300 further includes activating the at least one smart wearable device in response to the activity of the user in respect of the at least one smart wearable device; receiving activation related information with respect to the at least one smart wearable device; and displaying the activation related information as the second type of information for the at least one smart wearable device. In an embodiment, the activation related information indicates to the user that the smart wearable device is ready to communicate with the mobile device. In another embodiment, the activation related information comprises at least one characteristic of the smart wearable device that will distinguish the activated smart wearable devices from other non-activated smart wearable device. The at least one characteristic can include and is not limited to an activation signal, activation message and the like.

Figure 4:
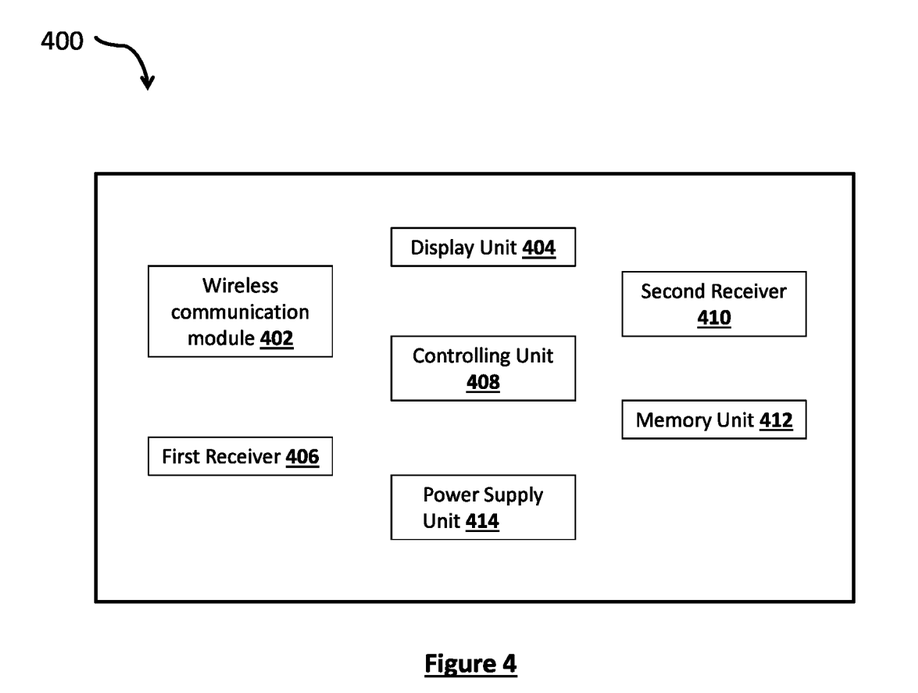
FIG. 4 depicts a block diagram of an apparatus for establishing a connection and a disconnection between a mobile device and a smart wearable device in accordance with an embodiment of the present invention.

Referring to FIG. 4, a block diagram of an apparatus for establishing a connection and disconnection with a smart wearable device is illustrated. The apparatus 400 is configured to implement the method illustrated in FIG. 3. The apparatus 400 includes a wireless communication module 402 configured to detect a plurality of smart wearable devices found to be in a communicative range over a communication network. The communication network comprises at least one of: a Bluetooth, a ZigBee, and an Infrared transmission network a WiFi, USB, a serial connection or any other means of wired or wireless connection. The communication network may include a master and peripheral type of connection between the mobile device and each of the plurality of smart wearable devices. In an embodiment, a display unit 404 is provided and configured to display a list comprising a first type of information corresponding to each of the detected plurality of smart wearable devices. The first type of information comprises at least a name and a type of the each of the detected plurality of smart wearable devices.

The apparatus 400 further includes a first receiver 406 configured to receive a request to establish a connection from at least one smart wearable device amongst the detected plurality of smart wearable devices, wherein the request to establish the connection is generated in response to an activity of a user in respect of the at least one smart wearable device. The activity of the user may include at least one of: a touch sensitive input, and a gesture-based input of the user. The user may shake the smart wearable device or press any button or touch the display of said smart wearable device. The apparatus 400 further includes a controlling unit 408 configured to select and execute a predefined rule to modify the first type of information into a second type of information regarding the at least one smart wearable device generating the request to establish the connection. The second type of information regarding the at least one smart wearable device comprises at least the first type of information regarding the at least one smart wearable device and a respective connectivity status. The connectivity status includes Ready, Not Ready, Idle etc.

The predefine rule may be selected by the user or a default predefined rule may be automatically selected to modify the first type of information. The controlling unit 408 includes one or more of a micro controller and microprocessor to execute the instructions based on the predefined rule. The first receiver 406 and the second receiver 410 may be standalone entities or may form a single entity. The first receiver 406 and the second receiver 410 include a transceiver.

The controlling unit 408 then establishes a communication between the at least one smart wearable device and the apparatus. The apparatus 400 further includes a memory unit 412 for storing details to relating to connection status of each of the smart devices. The commands for the executing the predefined rules to modify the first type of information is pre-programmed in the memory unit 412. A power supply unit 414 including a battery is further provided for supplying power to various modules/units of the apparatus 400. In yet another embodiment, the transceiver is configured to receive an input from the user to connect with the at least one smart wearable device linked with the second type of information. In yet another embodiment, the apparatus is an electronic device, for example, a mobile device.

Figure 5:
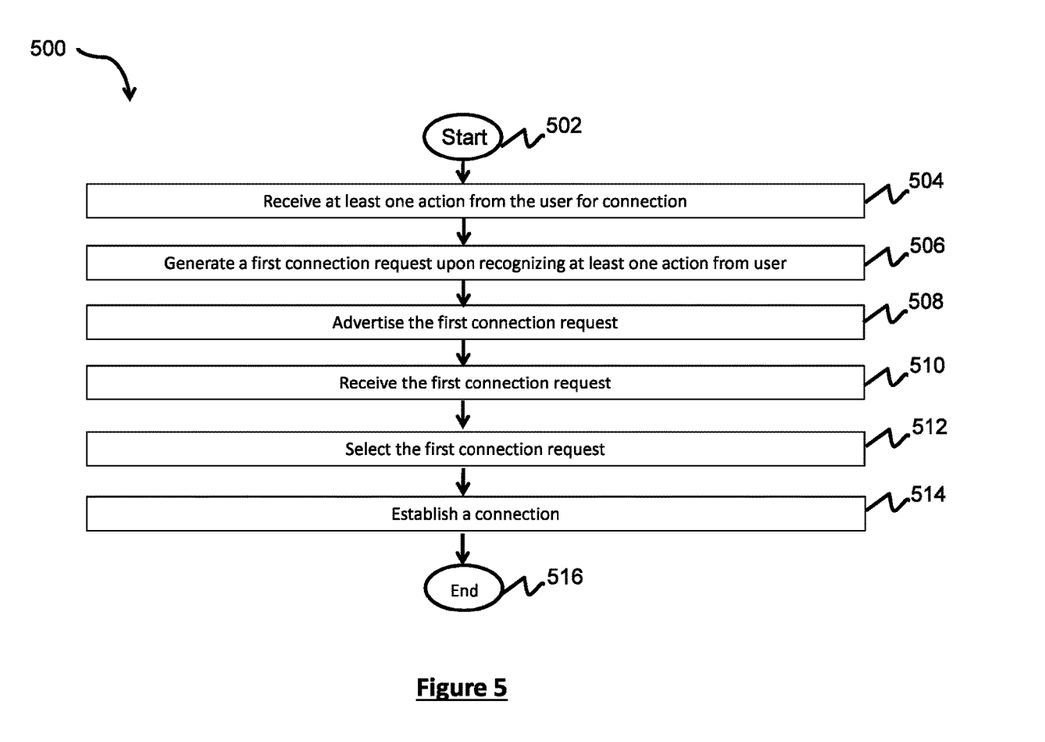
FIG. 5 depicts a flow diagram of a method for connection establishment by the smart device with the mobile device in accordance with an exemplary implementation of the present invention.

Referring to FIG. 5, a flow diagram of a method for connection establishment by the smart device with the mobile device in accordance with another implementation of the present invention is illustrated. The method 500 begins at step 502. At step 504, a smart device receives at least one action/activities from the user, for a connection. The action is mainly relating to the input given by the user to the smart device/activity performed by the user on the smart device. The user may perform one or more actions or activities which may include, but not limited to, a touch (for e.g.: appropriate menu in the device), a button interaction (push/press/rotate etc), any gesture (shaking/holding/tapping/rubbing etc). The smart device includes one or more of sensor elements such as a biometric device, a gesture sensing device, a movement sensing device, a light sensing device or a sound sensing device etc. and one or more processing circuitries capable of receiving and recognizing the action performed by the user. Upon recognizing one or more actions/activities by the user, the smart device generates a first connection request in step 506. The first connection request may contain information relating to smart device which may include, but not limited to, device_name, device_type and connection_ready signal. At step 508, the smart device advertises the first connection request. The range of advertising is, but not limited to, a maximum of 100 m and preferably between 10 m-30 m. At step 510, the mobile device receives the first connection request from the smart device. In an embodiment, the mobile device may display the first connection request from the smart device. In one implementation, when first connection is received, other connected devices are disconnected automatically from the mobile device. At step 512, the user selects the first connection request, to establish the connection between the smart device and mobile device and the connection is established in step 514. In another implementation, the user may make connection request to more than one smart devices and the user may sequentially or simultaneously select the first connection request from the respective smart devices. The method ends at step 516.

Figure 6:
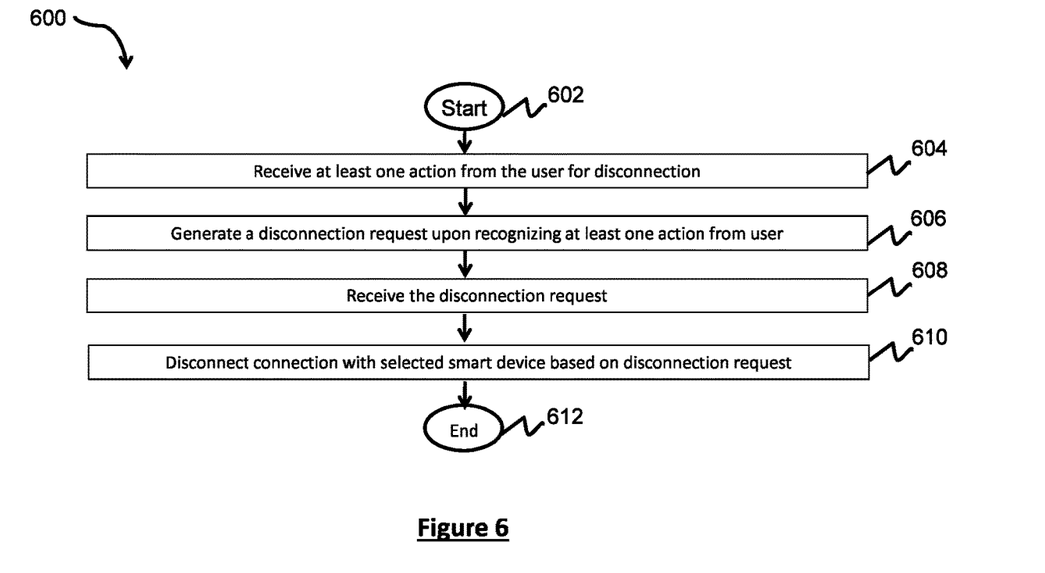
FIG. 6 depicts a flow diagram of a method for disconnecting one or more smart devices connected to a mobile device in accordance with an implementation of the present invention.

Referring to FIG. 6, a flow diagram depicting a method for disconnecting one or more smart devices connected to a mobile device in accordance with an implementation of the present invention is illustrated. The method 600 starts at step 602 and proceeds to step 604. At step 604, the user provides one or more disconnection actions/activities in respect of one or more connected smart devices. In an implementation, the user disconnection actions/activities may be same or different for different smart devices. The disconnection inputs may be same or different than the connection actions/activities. Upon receiving and recognizing one or more actions/activities for disconnection by the user, the smart device, at step 606, generates a disconnection request/signal that may contain may contain information relating to smart device which may include, but not limited to, device_name, device_type and connection_end signal. The disconnection request/signal containing the aforesaid information is transmitted and at step 608, the mobile device receives the disconnection signal. At step 610, communication with the one or more selected smart devices is disconnected from the mobile device and the method 600 ends at step 612.

The following paragraphs describe the exemplary implementation/use cases of the present invention. The description exemplary implementation/use cases are provided by way of examples and should not be construed to limit the scope of the invention.

When, the smart device is in range with the mobile device, the smart device automatically connects with the mobile device (by sending a default connection request or Bluetooth advertising). The default connection request may contain device_name and device_type. This data is captured and displayed on the mobile device. However, the user does not know, the device to connect one or more devices are with same device name and type. Every device (Bluetooth enabled) will generate a default connection request to connect with nearby Bluetooth enabled devices. Further, the smart device (for example, watch) and mobile device will act as a peripheral and master, respectively. The example default connection request may be :Watch_0065˜.

Case 1: Touch Based Smart Devices

Example Solution: In an embodiment, the display of smart device is used to capture the user inputs. When the touch-based actions are performed by the user and is recognized by the smart device (that the user wants to connect and pair), the smart device is capable of generating a first connection message and advertise the same to the nearby mobile device. The touch-based action is performed by the user only to activate that device for a moment and toggle the status as :ready to connect˜. This status message is automatically appended to the connection request. The modified first connection message may contain device_name, device_type, status_message etc. Example of a first connection message may be, :Watch_0032_ready to connect˜, :Watch_0065_ready˜. When, the mobile device lists the first connection request, and user can notice the change in connection request from :Watch_0065˜ to :Watch_0065_ready˜. Further, the user selects that smart device (which is ready) and the connection is established. In an embodiment, the user can tap on the touch display (Example for one time or more or in a sequence or any pattern), and then the first connection request is shared with the mobile device. In an embodiment, the same method may be used to generate a disconnection request/message (in the communication module of a watch) and shared with the mobile device.

Case 2: Button (Crown, Push Based, Rotation, or any Type)

Similarly, when a button is pressed in a watch or any smart device, a first connection request is generated and shared with the mobile device. In an embodiment, the same method may be used to generate a disconnection request/message (in the communication module of a watch) and shared with the mobile device.

Case 3: Gesture (Gesture Based Smart Devices)

In the same way, when the user performs any gesture actions (for example, tapping, shaking, holding a smart device). These gesture actions are captured by the sensor modules configured in the smart device and appropriate connection request is generated in the communication module and shared with the mobile device. For example, the user shakes the smart device in a particular manner (pattern), for one time (or two times or more), the user holds the smart device for a while (say for 3-5 seconds, or more), the user rubs the smart device (say for 1, 2 to 3 time, or more).

On the other side, in the mobile device, the mobile device will receive all messages (default and/or first connection messages) from the smart devices. Further, the mobile device shall display all the devices which are in communication range. The user can select one device (with the first connection request) from the list of devices and the connection is established between the mobile device and smart device. The smart device may be one of but not limited to watch, ring, or any wearable device, or any other device (which can able to connect with a mobile device, through Bluetooth or BLE or any communication standard). In an embodiment, the first connection request may be generated when the smart device is being connected for a first time.

The method and apparatus herein enable automatic connection between the one or more second devices and the first device. Accordingly, there is no need for the user to open the application corresponding to the second device and click on connect. In other words, the first device is always sensing for the one or more second devices that may need to connect and then automatically connects to the second device that indicates a change in the characteristic as described above. This process is completely automated, as the user does not have to access the first device, his smart phone or the application. A simple, selection input such as shaking the second device is required to connect it to corresponding application on the first device. Similarly, for disconnecting, if the first device is connected to 3 of the second devices, the user can shake and disconnect one of them. Again, there is no need to access the corresponding application.

Advantageously, the method and apparatus as described herein enables selection and connection of a subset of one or more second devices. Also, the method described herein enables first time pairing of IOT devices, and when there are multiple, similar devices within range. For example, in a store selling smart devices. All the smart devices are likely to have the same advertised name, making identifying and pairing with one particular smart device a challenge. This is traditionally solved using a common code displayed both on the smart device screen as well as the pairing smart phone, for example Bluetooth pairing codes. Pairing using the common mode is impossible for devices that do not have a display and cumbersome in devices that have a display. Using the method described above, for the desired device to be paired with, is provided with selection input, and modifying a characteristic such that the particular selected device is identified and connected with, followed with pairing for the very first time.

The method described herein is very intuitive, as easy as shake, press a button etc. to connect to a particular device, and removes manual intervention. Further the method and the apparatus as disclosed herein decrease power consumption by user devices by not connecting the portable user device to unused devices. Furthermore, the method and the apparatus as disclosed herein facilitates reduction in amount of the radio waves in the vicinity of the user by reducing the connections of the user portable device with unused smart devices. Moreover, the method and apparatus facilitate automatic connections and thus avoid manual intervention between the smart wearable device and mobile device, which considerably decreases the cumbersome method of choosing appropriate devices.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. A lso, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method for establishing a connection and a disconnection between a mobile device and a smart wearable device, the method comprising:
    detecting a plurality of smart wearable devices found to be in a communicative range of the mobile device over a communication network;
    displaying a list comprising a first type of information corresponding to each of the detected plurality of smart wearable devices, wherein the first type of information comprises at least a name and a type of the each of the detected plurality of smart wearable devices;
    receiving a request to establish a connection from at least one smart wearable device amongst the detected plurality of smart wearable devices, wherein the request to establish the connection is generated in response to an activity of a user in respect of the at least one smart wearable device, wherein the activity comprises a gesture-based input of the user and wherein the gesture-based input comprises at least one of shaking, tapping, rubbing and holding of the at least one smart wearable device;
    activating the at least one smart wearable device in response to the activity of the user in respect of the at least one smart wearable device;
    receiving an activation related information with respect to the at least one smart wearable device;
    displaying the activation related information as a second type of information for the at least one smart wearable device;
    selecting a predefined rule to modify the first type of information into the second type of information regarding the at least one smart wearable device generating the request to establish the connection, wherein the second type of information comprises at least the first type of information regarding the at least one smart wearable device and a respective connectivity status and wherein the predefined rule comprises instructions to perform the steps comprising:
        appending a readiness status of the at least one smart wearable device after at least a name and a type of the at least one smart wearable device within the list of detected plurality of smart wearable devices,
        momentarily highlighting the second type of information regarding the at least one smart wearable device, and
        hiding the list comprising the first type of information corresponding to each of the detected plurality of smart wearable devices;
    displaying the second type of information regarding the at least one smart wearable device in accordance with the predefined rule; and
    establishing a communication between the at least one smart wearable device linked with the second type of information and the mobile device.

2. The method as claimed in claim 1, wherein the activity of the user in respect of the at least one smart wearable device further comprises a touch sensitive input.

3. The method as claimed in claim 1, wherein the type of the each of the detected plurality of smart wearable devices indicates a form of the detected plurality of smart wearable devices.

4. The method as claimed in claim 1, wherein the activity related information comprises at least one characteristic of the detected plurality of smart wearable devices that distinguishes the activated smart wearable devices from other non-activated smart wearable devices.

5. The method as claimed in claim 4, wherein at least one characteristic comprises one of an activation signal and an activation message.

6. The method as claimed in claim 1, further comprising:
    receiving a connection disconnect request from the at least one smart wearable device; and
    disconnecting the at least one smart wearable device with the mobile device.

7. The method as claimed in claim 1, further comprising: receiving an input from the user to connect with the at least one smart wearable device having the second type of information.

8. An apparatus for establishing a connection and disconnection with a smart wearable device, the apparatus comprising:
    a wireless communication module configured to detect a plurality of smart wearable devices found to be in a communicative range of the mobile device over a communication network;
    a display unit configured to display a list comprising a first type of information corresponding to each of the detected plurality of smart wearable devices;
    a first receiver configured to receive a request to establish a connection from at least one smart wearable device amongst the detected plurality of smart wearable devices, wherein the request to establish the connection is generated in response to an activity of a user in respect of the at least one smart wearable device, wherein the activity comprises a gesture-based input of the user and wherein the gesture-based input comprises at least one of shaking, tapping, rubbing and holding of the at least one smart wearable device;

a controlling unit configured to activate the at least one smart wearable device in response to the activity of the user in respect of the at least one smart wearable device, the display unit configured to receive an activation related information with respect to the at least one smart wearable device and display the activation related information as a second type of information for the at least one smart wearable device;

the controlling unit configured to select a predefined rule to modify the first type of information into the second type of information regarding the at least one smart wearable device generating the request to establish the connection, wherein the second type of information comprises at least the first type of information regarding the at least one smart wearable device and a respective connectivity status and wherein the predefined rule comprises instructions to:

append a readiness status of the at least one smart wearable device after at least a name and a type of the at least one smart wearable device within the list of detected plurality of smart wearable devices, momentarily highlight the second type of information regarding the at least one smart wearable device, and hide the list comprising the first type of information corresponding to each of the detected plurality of smart wearable devices; and the display unit configured to display the second type of information regarding the at least one smart wearable device in accordance with the predefined rule, wherein the controlling unit is configured to establish a communication between the at least one smart wearable device and the apparatus.

9. The apparatus as claimed in claim 8, wherein the activity of the user in respect of the at least one smart wearable device further comprises a touch sensitive input and wherein the type of the each of the detected plurality of smart wearable devices indicates a form of the detected plurality of smart wearable devices.

10. The apparatus as claimed in claim 8, wherein the activity related information comprises at least one characteristic of the detected plurality of smart wearable devices that distinguishes the activated smart wearable devices from other non-activated smart wearable devices and wherein at least one characteristic comprises one of an activation signal and an activation message.

11. A system for establishing a connection and disconnection with a smart wearable device, the system comprising:

a wireless communication module configured to detect a plurality of smart wearable devices found to be in a communicative range of the mobile device over a communication network;

a display unit configured to display a list comprising a first type of information corresponding to each of the detected plurality of smart wearable devices;

a first receiver configured to receive a request to establish a connection from at least one smart wearable device amongst the detected plurality of smart wearable devices, wherein the request to establish the connection is generated in response to an activity of a user in respect of the at least one smart wearable device, wherein the activity comprises a gesture-based input of the user and wherein the gesture-based input comprises at least one of shaking, tapping, rubbing and holding of the at least one smart wearable device;

a controlling unit configured to activate the at least one smart wearable device in response to the activity of the user in respect of the at least one smart wearable device, the display unit configured to receive an activation related information with respect to the at least one smart wearable device and display the activation related information as a second type of information for the at least one smart wearable device;

the controlling unit configured to select a predefined rule to modify the first type of information into the second type of information regarding the at least one smart wearable device generating the request to establish the connection, wherein the second type of information comprises at least the first type of information regarding the at least one smart wearable device and a respective connectivity status and wherein the predefined rule comprises instructions to:

append a readiness status of the at least one smart wearable device after at least a name and a type of the at least one smart wearable device within the list of detected plurality of smart wearable devices, momentarily highlight the second type of information regarding the at least one smart wearable device, and hide the list comprising the first type of information corresponding to each of the detected plurality of smart wearable devices; and the display unit configured to display the second type of information regarding the at least one smart wearable device in accordance with the predefined rule, wherein the controlling unit is configured to establish a communication between the at least one smart wearable device and an apparatus.

12. The system as claimed in claim 11, wherein the activity of the user in respect of the at least one smart wearable device further comprises a touch sensitive input and wherein the type of the each of the detected plurality of smart wearable devices indicates a form of the detected plurality of smart wearable devices.

13. The system as claimed in claim 11, wherein the activity related information comprises at least one characteristic of the detected plurality of smart wearable devices that distinguishes the activated smart wearable devices from other non-activated smart wearable devices and wherein at least one characteristic comprises one of an activation signal and an activation message.

* * * * *